Patented Feb. 25, 1941

2,232,730

UNITED STATES PATENT OFFICE 2,232,730

MANUFACTURE OF DERIVATIVES OF PREGNENE-DIONES

Tadeus Reichstein, Zurich, Switzerland, assignor, by mesne assignments, to Roche-Organon, Inc., Nutley, N. J., a corporation of New Jersey No Drawing. Application March 10, 1938, Serial No. 195,160. In Switzerland March 29, 1937

9 Claims. (Cl. 260—397)

In application Ser. No. 195,162 a process was described for the preparation of saturated and unsaturated derivatives of pregnanedione-3,20 being substituted at the carbon atom $C_{21}$ by a halogen of a monovalent oxygenous group and which may bear further substituents in the ring system, especially oxygen.

Now it was found that unsaturated compounds belonging to this group and having a double bond between the carbon atoms $C_4$ and $C_5$ can be obtained from the corresponding saturated derivatives by halogenation and subsequent elimination of hydrogen halide.

If derivatives of halogen-21-pregnane-dione-3,20 are used as starting material the elimination of hydrogen halide is appropiately effected with salts of organic or weak inorganic acids. In this way besides the elimination of hydrogen halide the halogen in the side chain is substituted by a hydroxyl or an acyloxyl group. The process can be elucidated for two simple cases by the following formulae:

oxy-21-pregnene-4-dione-3,20 (Formula III) already described in the application Ser. No. 195,162 or upon simultaneous or subsequent saponification the free oxy-diketone (VI). The simultaneous saponification can e. g. be effected by treating (II) in alcoholic solution with sodium formate or in an aqueous dioxane solution with potassium bicarbonate etc. From the chloro-21-diketone (IV) obtained according to the application Ser. No. 195,162 the brominated diketone (V) is prepared in analogous manner. Upon heating with sodium acetate in glacial acetic acid this is converted into (III); with sodium formate etc. in aethanol etc. (VI) is formed directly. In quite analogous manner the process can be carried out with derivatives bearing further substituents in the ring system especially oxygen. An analogous reaction for the conversion of saturated into unsaturated diketones has already been described in the case of the simple pregnane-dione-3,20 (Butenandt, Schmidt, Ber. 67, 1901, 1934).

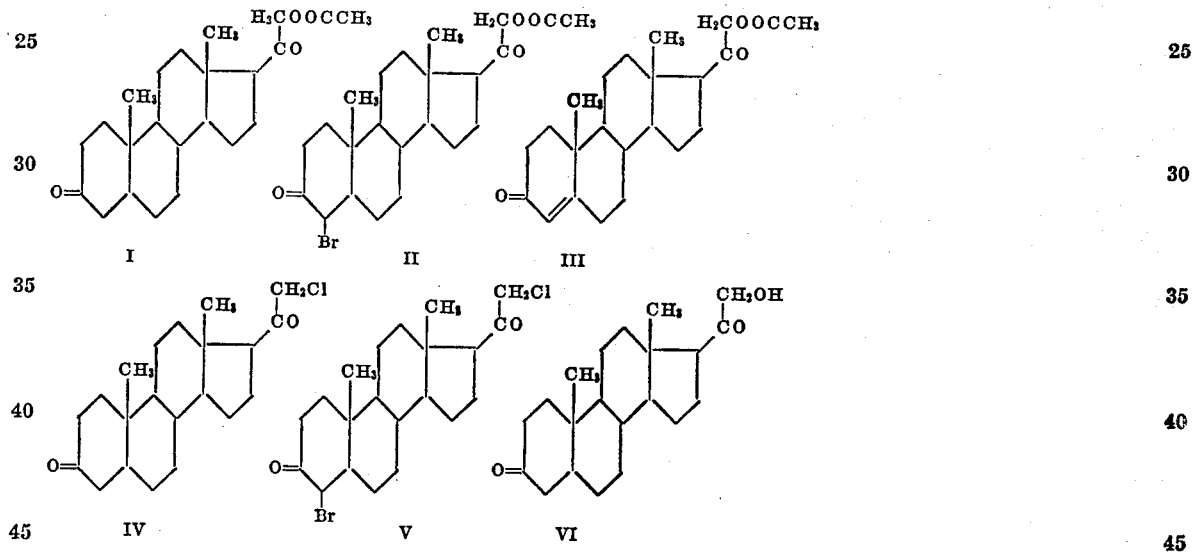

The acetoxy-21-pregnane-dione-3,20 (Formula I) which may e. g. be obtained from aetio-litocholic acid according to the processes described in application Ser. No. 195,161 and Ser. No. 195,162 is brominated. The bromine atom preferably enters at the carbon atom $C_4$. The brominated diketone (Formula II) which need not be isolated in the pure state gives upon heating with pyridine or with sodium acetate the acet- It could not be predicted, however, that the reaction is also applicable to derivatives bearing at the carbon atom $C_{21}$ a halogen atom or an oxygenous group, these derivatives having a sensitive reducing group.

The compounds obtained will be used in therapeutics, especially for the preparation of such agents as have the action of the cortical suprarenal hormone.

Example 1

0.5 g. of acetoxy-21-pregnane-dione-3,20 are dissolved in 5 ml. of glacial acetic acid. To this a solution of 0.225 g. of bromine in a small quantity of glacial acetic acid is gradually added. The decoloration first proceeds slowly, then rapidly. After completion of the reaction 2 g. of dry potassium acetate are added and the mixture is boiled with reflux during 4 hours. Then the solution is concentrated in vacuo and water is added followed by extraction with ether. The ethereal solution is washed with sodium carbonate solution whereupon the further purification is carried out as described in the application Ser. No. 195,162. A distillation in a high vacuum followed by a provisional purification by absorption e. g. an aluminium oxide may if desired be effected which facilitates the purification of the crystals. The acetoxy-pregnene - 4 - dione-3,20 M. P. 160° C. (corr.) as described in the application Ser. No. 195,162 is obtained.

For the elimination of hydrogen bromide pyridine can also be used.

Example 2

To a solution of 0.5 g. of chloro-21-pregnane-dione-3,20 in glacial acetic acid 0.258 g. of bromine are gradually added. After complete decoloration which has occurred after a few minutes 2 g. of potassium acetate are added and the mixture is heated with reflux during 4 hours. The purification is effected in the same manner as described in Example 1 by which the acetoxy-21-pregnene-4-dione-3,20 is likewise obtained. If after the bromination the acetic acid is eliminated in vacuo followed by addition of 10 ml. of 90% aethanol and 2 g. of sodium formate and boiling with reflux during 12 hours and an analogous purification process the result is the pregnene-4-ol-21-dione-3,20 already described in the application Ser. No. 195,162. (M. P. about 138° C.)

What I claim is:

1. The process which comprises reacting a halogen with a saturated cyclopentano-dimethyl-10,13-polyhydro-phenanthrene compound having a keto group at $C_3$ and a side chain at $C_{17}$ of the form —CO.CH$_2$R, in which R indicates a radical from the class consisting of hydroxyl, halogen, acyloxyl and alkoxyl, and thereafter splitting off hydrogen halide from the reaction product to produce a double bond in ring A of the compound.

2. The process which comprises reacting a halogen with a saturated cyclopentano-dimethyl-10,13-polyhydro-phenanthrene compound having a keto group at $C_3$ and a side chain at $C_{17}$ of the form —CO.CH$_2$R in which R indicates a radical from the class consisting of hydroxyl, halogen, acyloxyl and alkoxyl.

3. The process of claim 1 further characterized in that bromine is reacted with acetoxy-21-pregnane-dione-3,20.

4. The process of claim 1 further characterized in that bromine is reacted with chloro-21-pregnane-dione-3,20.

5. The process which comprises reacting a halogen with a saturated cyclopentano-dimethyl-10,13-polyhydro-phenanthrene compound having a keto group at $C_3$ and a side chain at $C_{17}$ of the form —CO.CH$_2$R in which R indicates a radical from the class consisting of hydroxyl, halogen, acyloxyl, and alkoxyl, and thereafter treating the reaction product with a material from the class consisting of salts of organic acids and weak in organic oxygenous acids to split off hydrogen halide from the reaction product to produce a double bond in ring A of the compound.

6. The process of claim 5 further characterized in that bromine is reacted with acetoxy-21-pregnane-dione-3,20.

7. The process of claim 5 further characterized in that bromine is reacted with chloro-21-pregnane-dione-3,20.

8. As new compositions of matter, saturated cyclopentano-dimethyl-10,13-polyhydro-phenanthrene compounds having a keto group at $C_3$, a halogen radical at $C_4$, and a side chain at $C_{17}$ in the form —CO.CH$_2$R, in which R indicates a radical from the class consisting of hydroxyl, halogen, acyloxyl and alkoxyl.

9. As new compounds the 4-bromo derivatives of pregnane-dione-3,20, substituted at the carbon atom C 21, having the general formula

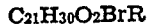

and the structure:

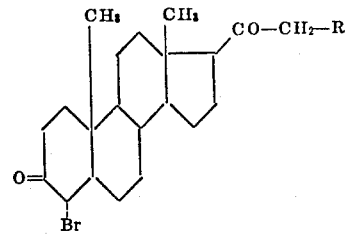

R stands for hydroxyl, halogen, acyloxyl, alkoxyl.

TADEUS REICHSTEIN.